(12) United States Patent
Liang et al.

(10) Patent No.: US 9,204,433 B2
(45) Date of Patent: Dec. 1, 2015

(54) METHOD AND SYSTEM FOR PROCESSING AN UPLINK CONTROL SIGNALING FEEDBACK

(75) Inventors: Chunli Liang, Shenzhen (CN); Bo Dai, Shenzhen (CN); Bin Yu, Shenzhen (CN); Weiwei Yang, Shenzhen (CN); Peng Zhu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 354 days.

(21) Appl. No.: 13/703,010

(22) PCT Filed: Jan. 7, 2011

(86) PCT No.: PCT/CN2011/070108
§ 371 (c)(1),
(2), (4) Date: Dec. 8, 2012

(87) PCT Pub. No.: WO2011/160448
PCT Pub. Date: Dec. 29, 2011

(65) Prior Publication Data
US 2013/0077596 A1    Mar. 28, 2013

(30) Foreign Application Priority Data
Jun. 24, 2010   (CN) .......................... 2010 1 0214182

(51) Int. Cl.
*H04W 72/04* (2009.01)
*H04L 1/00* (2006.01)
(Continued)

(52) U.S. Cl.
CPC ......... *H04W 72/0413* (2013.01); *H04L 1/0031* (2013.01); *H04L 1/1671* (2013.01); *H04L 1/1861* (2013.01); *H04L 5/001* (2013.01); *H04L 5/0053* (2013.01)

(58) Field of Classification Search
USPC ......................................................... 370/329
See application file for complete search history.

(56) References Cited

U.S. PATENT DOCUMENTS

| 2010/0098012 | A1  | 4/2010  | Bala et al. |
| 2010/0271970 | A1* | 10/2010 | Pan et al. ...................... 370/252 |
| 2011/0141928 | A1* | 6/2011  | Shin et al. ...................... 370/252 |

FOREIGN PATENT DOCUMENTS

| CN | 101442816 A | 5/2009 |
| CN | 101635987 A | 1/2010 |

(Continued)

OTHER PUBLICATIONS

P.R. China, State Intellectual Property Office, International Search Report for International Application No. PCT/CN2011/070108, mailed Apr. 7, 2011.

(Continued)

*Primary Examiner* — Thai Nguyen
(74) *Attorney, Agent, or Firm* — Bright IP Law Offices

(57) ABSTRACT

The present invention provides a method and system for processing an uplink control signaling feedback. The method comprises: a base station configuring a feedback mode of an uplink control signaling for user equipment, wherein the feedback mode is used for instructing the user equipment a manner in which to transmit the uplink control signaling on a physical uplink control channel (PUCCH) and/or a physical uplink shared channel (PUSCH); and the user equipment sending the uplink control signaling according to the feedback mode. By way of the present invention, it is ensured that the base station can correctly demodulate the uplink control signaling.

13 Claims, 8 Drawing Sheets

(51) Int. Cl.
H04L 1/16 (2006.01)
H04L 1/18 (2006.01)
H04L 5/00 (2006.01)

(56) References Cited

FOREIGN PATENT DOCUMENTS

CN 101883391 A 11/2010
WO 2010013963 2/2010

OTHER PUBLICATIONS

3rd Generation Partnership Project, Technical Specification Group Radio Access Network, "Evolved Universal Terrestrial Radio Access (E-UTRA); Further advancements for E-UTRA physical layer aspects", 3GPP TR 36.814 V9.0.0, Mar. 30, 2010, p. 9 section 5.3—p. 12 section 6.3.

EPO, Extended European Search Report for App. No. EP11797479. 0, dated Dec. 17, 2013.

Nokia Siemens Networks et al: "Performance comparison of PUCCH ACK/NACK transmission schemes for CC aggregation", 3GPP Draft; R1-101418, 3rd Generation Partnership Project (3GPP), Mobile Competence Centre, 658, Route Des Lucioles ; F-86921 Sophia-Antipolis Cedex, France, vol. RAN WG1, No. San Francisco, USA; 28108222, 16 February 2818 (2818-82-16), XP858418885, [retrieved on 2010-82-16]. *section 3 *.

"3rd Generation Partnership Project; Technical Specification Group Radio Access Network; Evolved Universal Terrestrial Radio Access (E-UTRA); Further advancements for E-UTRA physical layer aspects (Release 9)". 3GPP Standard; 3GPP TR 36.814. 3rd Generation Partnership Project (3GPP). Mobile Competence Centre. 650. Route Des Lucioles , F-06921 Sophia-Antipolis Cedex, France, No. V9.0.0. Mar. 30, 2010, pp. 1-100, XP050402153. [retrieved on Mar. 30, 2010] * sections 5.3-6.3 *.

Motorola: "Release 10 UE PUCCH/PUSCH configuration". 3GPP Draft; R4-100207, 3rd Generation Partnership Project (3GPP), Mobile Competence Centre; 650, Route Des Lucioles , F-06921 Sophia-Antipolis Cedex; France. vol. RAN WG4, No. Sophia; Jan. 18, 2010. XP050427892. [retrieved on Jan. 18, 2010] * the whole document *.

Samsung, Simultaneous PUSCH and PUCCH Transmissions, 3GPP TSG RAN WG1 #61bis Dresden, Germany, Jun. 28-Jul. 2, 2010.

Alcatel-Lucent, Alcatel-Lucent Shanghai Bell, Power scaling method for maximum power, 3GPP TSG RAN WG1 #61 Montreal, Canada, May 10-14, 2010.

\* cited by examiner

US 9,204,433 B2

METHOD AND SYSTEM FOR PROCESSING AN UPLINK CONTROL SIGNALING FEEDBACK

CROSS REFERENCE TO RELATED APPLICATIONS

This application is the U.S. National Stage of International Patent Application No. PCT/CN2011/070108 filed on Jan. 7, 2011, which claims priority to Chinese Patent Application No. 201010214182.4 filed on Jun. 24, 2010. Both the PCT Application and Chinese Application are hereby incorporated by reference in their entirety.

FIELD OF THE INVENTION

The present invention relates to the communication field, and in particular to a method and system for processing an uplink control signaling feedback.

BACKGROUND OF THE INVENTION

In the long term evolution (abbreviated as LTE) system, the control signaling which needs to be transmitted in the uplink includes an acknowledgement/negative acknowledgement (abbreviated as ACK/NACK) message, a scheduling request (abbreviated as SR), and information reflecting the downlink physical channel state (abbreviated as CSI), which information has three forms: channel quality indication (abbreviated, as CQI), pre-coding matrix indicator (abbreviated as PMI), and rank indicator (abbreviated as RI).

When the user equipment (abbreviated as UE) has no physical uplink shared channel (abbreviated as PUSCH), the above uplink control signaling is sent on the physical uplink control channel (abbreviated as PUCCH).

The LTE defines a plurality of PUCCH formats, including PUCCH format 1/1a/1b and format 2/2a/2b, wherein format 1 is used for sending the scheduling request SR from the UE, format 1a and 1b are used for feeding back a 1 bit ACK/NACK message and 2 bits ACK/NACK message respectively, format 2 is used for sending the channel state information (CSI) of the downlink and for simultaneously sending CSI and ACK/NACK message (when it needs to send two kinds of uplink control signaling in the same subframe) when the subframe uses an extended cyclic prefix, format 2a is used for sending CSI and 1 bit ACK/NACK message (when it needs to send two kinds of uplink control signaling in the same subframe), and format 2b is used for sending CSI information and 2 bits ACK/NACX message (when it needs to send two kinds of uplink control signaling in the same subframe). However, when the user equipment has a PUSCH for sending simultaneously, in order to ensure the single carrier property of the uplink, the uplink control signaling needs to be multiplexed on the PUSCH and sent together with the data. In this case, the feedback of the three forms of CSI (CQI/PMI and RI) can be periodic feedback and can also be aperiodic feedback, and Table 1: uplink physical channel corresponding to periodic feedback and aperiodic feedback, and the particular feedback is as shown in FIG. 1:

| Scheduling mode | Periodic CQI reporting channel | Aperiodic CQI reporting channel |
|---|---|---|
| Frequency non-selective | PUCCH | |
| Frequency selective | PUCCH | PUSCH |

In this case, as to CQI/PMI and RI which are fed back periodically, if the UE does not need to send uplink data, then the CQI/PMI and RI which are fed back periodically are transmitted on the PUCCH in the format of 2/2a/2b (PUCCH format 2/2a/2b), and if the UE needs to send uplink data, then the CQI/PMI and RI are sent on the PUSCH; and as to CQI/PMI and RI which are fed back aperiodically, they are only transmitted on the PUSCH, and it is provisioned that when it needs to feed back periodic and aperiodic CSI on the same subframe, the periodic CSI will be dropped and only aperiodic CSI will be fed back.

In order to meet the requirements of the International Telecommunication Union-Advanced (abbreviated as ITU-Advanced), the long term evolution advanced (abbreviated as LTE-A) system as the evolution standard of LTE needs to support larger system bandwidth (up to 100 MHz) and needs to be backward compatible with the existing standard of the LTE. On the basis of the existing LTE system, the bandwidth of the LTE system can be combined to obtain larger bandwidth, and this technology is referred to as carrier aggregation (abbreviated as CA) technology, which technology can improve the frequency spectrum utilization rate of the IMT-Advance system and relieve the lack of frequency spectrum resources, thereby optimizing the use of frequency spectrum resources.

In an LTE-A system which uses the carrier aggregation technology, the uplink bandwidth and downlink bandwidth can include a plurality of component carriers. When the base station has physical downlink shared channel (abbreviated as PDSCH) which will be scheduled to the UE on a plurality of downlink component carriers and when the UE has no PUSCH to send in the current subframe, the UE needs to feed back the ACK/NACK message corresponding to PDSCH of the plurality of downlink component carriers on PUCCH. Currently, in relevant art, one working assumption is that these ACK/NACK messages are sent in a UE-specific uplink component carrier; as to the SR information, the working assumption is that the UE only sends one SR and this SR information is sent in a UE-specific uplink component carrier; as to periodic CSI information, the working assumption is that the CSI information is sent in a UE-specific uplink component carrier. The above working assumptions indicate that at most only one uplink component carrier can send the PUCCH.

However, since the LTE-A system loosens the requirements on uplink single carrier property, the PUCCH and PUSCH are allowed to be sent simultaneously. Due to the introduction of carrier aggregation, the PUSCH can be sent on a plurality of carriers simultaneously. In this way, it may appear several situations that the PUSCH and PUCCH on the same carrier are sent simultaneously, and the PUSCH and PUCCH on different carriers are sent simultaneously, and the like. In this situation, in relevant art, no technical solution regarding how to send the uplink control signaling is disclosed, therefore, in the current LTE-A system, the base station and UE have no common understanding about where to send the uplink control signaling, causing that the uplink control signaling cannot be processed correctly.

SUMMARY OF THE INVENTION

The main object of the present invention is to provide a solution for processing an uplink control signaling feedback so as to solve at least the above problems.

A method for processing an uplink control signaling feedback is provided according to one aspect of the present invention, including: a base station configuring a feedback mode of an uplink control signaling for user equipment, wherein the feedback mode is used for instructing the user equipment a manner in which to transmit the uplink control signaling on a physical uplink control channel (PUCCH) and/or physical uplink shared channel (PUSCH); and the user equipment sending the uplink control signaling according to the feedback mode.

Preferably, the feedback mode includes: allowing a simultaneous transmission of the PUCCH and the PUSCH, and transmission of the uplink control signaling on the PUCCH, wherein the uplink control signaling includes at least one of: an acknowledgement/negative acknowledgement ACK/NACK message, a scheduling request, and periodic channel state information.

Preferably, if the uplink control signaling includes at least two of ACK/NACK message, scheduling request, or periodic channel state information, the uplink control signaling is multiplexed on the PUCCH.

Preferably, when the control field of triggering an aperiodic channel state information in the downlink control information corresponding to the PUSCH is enable, if the uplink control signaling does not include the periodic channel state information, the aperiodic channel state information is sent on the corresponding PUSCH; if the uplink control signaling includes the periodic channel state information and the aperiodic channel state information includes the channel state information of a downlink component carrier indicated by the periodic channel state information, the aperiodic channel state information is sent on the corresponding PUSCH while the periodic channel state information is dropped; and if the uplink control includes the periodic channel state information but the aperiodic channel state information does not include the channel state information of the downlink component carrier indicated by the periodic channel state information, the aperiodic channel state information is sent on the corresponding PUSCH and the periodic channel state information is sent on the PUCCH, or the periodic channel state information and aperiodic channel state information are combined into a new channel state information report, and the new channel state information is sent on the PUSCH that corresponds to the downlink control information that triggers the transmission of the aperiodic channel state information.

Preferably, the feedback mode includes: allowing a simultaneous transmission of the PUCCH and the PUSCH, and transmission of the uplink control signaling on the PUCCH and PUSCH, wherein the uplink control signaling includes at least one of an ACK/NACK message, a scheduling request, and periodic channel state information.

Preferably, if the uplink control signaling only includes one of the ACK/NACK message, the scheduling request, and the periodic channel state information, or includes the ACK/NACK message and the scheduling request, then it is sent on the PUCCH.

Preferably, if the uplink control signaling includes the periodic channel state information and at least one of the ACK/NACK message and the scheduling request, then at least one of the ACK/NACK message and the scheduling request is sent on the PUCCH, and the periodic channel state information is sent on the PUSCH.

Preferably, the periodic channel state information is sent on the PUSCH comprises: if the uplink component carriers on which the PUSCH are to be sent include an uplink primary component carrier, the periodic channel state information is sent on the PUSCH corresponding to the uplink primary component carrier; if the uplink component carriers on which the PUSCH are to be sent do not include the uplink primary component carrier, the periodic channel state information is sent by one of the following manners: the periodic channel state information is sent on a PUSCH corresponding to an uplink component carrier with a highest or lowest carrier frequency; the periodic channel state information is sent on a PUSCH corresponding to an uplink component carrier meeting a preset relationship with the uplink primary component carrier; the periodic channel state information is sent on a PUSCH corresponding to an uplink component carrier that is configured by a higher layer; or the periodic channel state information is sent on a PUSCH corresponding to an uplink component carrier with a largest or smallest carrier index.

Preferably, the carrier associated with the PUCCH and the carrier associated with the PUSCH are either the same carrier or different carriers.

Preferably, the feedback mode includes: not allowing a simultaneous transmission of the PUCCH and the PUSCH, and the uplink control signaling is sent on the PUSCH and the PUCCH is not sent simultaneously.

Preferably, the uplink control signaling being sent on the PUSCH comprises: if the uplink component carriers on which the PUSCH are to be sent include an uplink primary component carrier, the uplink control information is sent on the PUSCH corresponding to the uplink primary component carrier; if the uplink component carriers on which the PUSCH are to be sent do not include the uplink primary component carrier, the uplink control signaling is sent by one of the following manners: the uplink control signaling is sent on the PUSCH corresponding to an uplink component carrier with a highest or lowest carrier frequency; the uplink control signaling is sent on the PUSCH corresponding to an uplink component carrier meeting a preset relationship with the uplink primary component carrier; the uplink control signaling is sent on the PUSCH corresponding to an uplink component carrier that is configured by a higher layer; or the uplink control signaling is sent on the PUSCH corresponding to an uplink component carrier with a largest or smallest carrier index.

Preferably, when the control field of triggering an aperiodic channel state information in the downlink control information corresponding to the PUSCH is enable, if the uplink control signaling does not include the periodic channel state information, the aperiodic channel state information is sent on the corresponding PUSCH; and if the uplink control signaling includes the periodic channel state information and the aperiodic channel state information does not include the channel state information of a downlink component carrier indicated by the periodic channel state information, the periodic channel state information and aperiodic channel state information are combined into a new channel state information report, and the new channel state information is sent on the PUSCH that corresponds to the downlink control information that triggers the transmission of the aperiodic channel state information; and if the uplink control signaling includes the periodic channel state information and the aperiodic channel state information includes the channel state information of a downlink component carrier indicated by the periodic channel state information, the aperiodic channel state information is sent on the corresponding PUSCH while the periodic channel state information is not sent out simultaneously.

A system for processing an uplink control signaling feedback is provided according to another aspect of the present invention, comprising a base station and user equipment, with the base station configuring a feedback mode of an uplink control signaling for the UE, wherein the feedback mode is used for instructing the user equipment a manner in which to transmit the uplink control signaling on a PUCCH and/or PUSCH; and the user equipment sending the uplink control signaling according to the feedback mode.

Preferably, the feedback mode configured by the base station for the UE includes: allowing a simultaneous transmission of the PUCCH and the PUSCH, and transmission of the uplink control signaling on the PUCCH, wherein the uplink control signaling includes at least one of an ACK/NACK message, a scheduling request, and periodic channel state information.

Preferably, the feedback mode configured by the base station for the UE includes: allowing a simultaneous transmission of the PUCCH and the PUSCH, and transmission of the uplink control signaling on the PUCCH and the PUSCH, wherein the uplink control signaling includes at least one of: an ACK/NACK message, a scheduling request, and periodic channel state information.

Preferably, the feedback mode configured by the base station for the UE includes: not allowing a simultaneous transmission of the PUCCH and the PUSCH, and the uplink control signaling is sent on the PUSCH without being sent out on the PUCCH simultaneously.

By way of the present invention, a base station configures a feedback mode of an uplink control signaling for the UE, wherein the feedback mode is used for instructing the user equipment a manner in which to transmit the uplink control signaling, on a physical uplink control channel (PUCCH) and/or physical uplink shared channel (PUSCH); and the user equipment sending the uplink control signaling according to the feedback mode. The problem that how to send the uplink control signaling is not disclosed in relevant art and it causes that the uplink control signaling cannot be processed correctly is solved, thus it is ensured that the base station can correctly demodulate the uplink control signaling.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the accompanying drawings and in conjunction with embodiments. It needs to note that the embodiments of the present application and the features in the embodiments can be combined with each other if there is no conflict.

Figure 1:
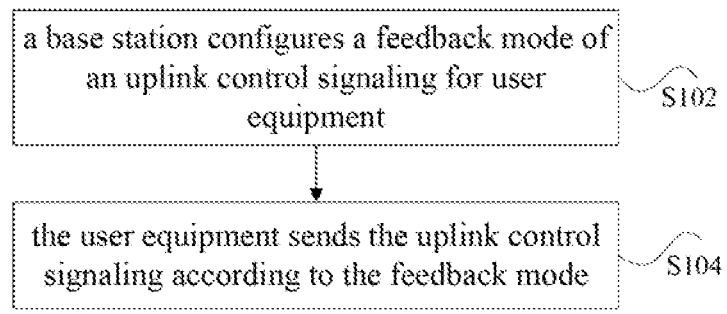
FIG. 1 is a flowchart of a method for processing an uplink control signaling feedback according to the embodiments of the present invention.

In this embodiment, a method for processing an uplink control signaling feedback is provided, and FIG. 1 is a flowchart of a method for processing an uplink control signaling feedback according to the embodiments of the present invention, as shown in FIG. 1, this procedure includes the following steps:

Step S102: a base station configures a feedback mode of an uplink control signaling for user equipment, wherein the feedback mode is used for instructing the user equipment a manner in which to transmit the uplink control signaling on a physical uplink control channel (PUCCH) and/or a physical uplink shared channel (PUSCH); and Step S104: the user equipment sends the uplink control signaling according to the feedback mode.

By way of the above steps, the base station can configures the feedback mode of the uplink control signaling for the user equipment, and the user equipment can send the uplink control signaling according to the feedback mode, enabling the base station and user equipment to achieve common understanding about where to send the uplink control signaling, thereby enabling the base station and user equipment to correctly process the uplink control signaling.

A system for processing an uplink control signaling feedback is provided in this embodiment, including a base station and user equipment, with the base station configuring a feedback mode of an uplink control signaling for the UE, wherein, the feedback mode is used for instructing the user equipment a manner in which to transmit the uplink control signaling on a PUCCH and/or PUSCH, and the user equipment sending the uplink control signaling according to the feedback mode.

Preferably, the feedback mode includes: allowing a simultaneous transmission of the PUCCH and the PUSCH, and transmission of the uplink control signaling on the PUCCH, wherein the uplink control signaling includes at least one of an ACK/NACK message, a scheduling request, and periodic channel state information.

Preferably, the feedback mode includes: allowing a simultaneous transmission of the PUCCH and the PUSCH, and transmission of the uplink control signaling on the PUCCH and PUSCH, wherein the uplink control signaling includes at least one of: an ACK/NACK message, a scheduling request, and periodic channel state information.

Preferably, the feedback mode includes: not allowing a simultaneous transmission of the PUCCH and the PUSCH, and the uplink control signaling is sent on the PUSCH and the PUCCH is not sent simultaneously.

Embodiment One

A method for sending an uplink control signaling in a large bandwidth multicarrier system is provided in this embodiment, and this embodiment solves the problem about where to send the uplink control signaling when simultaneous transmission of PUCCH and PUSCH is supported. This method includes: a base station configuring a feedback mode of an uplink control signaling for the UE, and the UE sending the uplink control signaling according to the feedback mode indicated by the base station. Hereinafter, the feedback mode will be described respectively.

Mode 1

Allow a simultaneous transmission of the PUCCH and the PUSCH and all transmission of the uplink control signaling on the PUCCH.

Preferably, as to mode 1, the uplink carrier associated with the PUCCH and the uplink carrier associated with the PUSCH can be the same carrier or different carriers; and the uplink control signaling is one or more of an ACK/NACK message, a scheduling request, and periodic channel state information.

Preferably, as to mode 1, when the uplink control signaling only includes one of the ACK/NACK message, the scheduling request, and the periodic channel state information, the uplink control signaling is sent on the PUCCH.

Preferably, as to mode 1 when the uplink control signaling includes some of the ACK/NACK message, the scheduling request, and the periodic channel state information, the uplink control signaling is sent using the method of multiplexing a plurality of uplink control signaling on the PUCCH.

Preferably, as to mode 1, when the control field of triggering an aperiodic channel state information in the downlink control information (abbreviated as DCI) is enable, then the aperiodic. CSI is sent on the corresponding PUSCH. In this case, if the uplink control signaling includes periodic CSI and the aperiodic CSI includes the CSI of the downlink component carrier corresponding to the periodic CSI, the aperiodic CSI is sent on the corresponding PUSCH and the periodic CSI is not sent out simultaneously. If the uplink control signaling includes periodic CSI and the aperiodic CSI does not include the CSI of the downlink component carrier indicated by the periodic CSI, the aperiodic CSI is sent on the corresponding PUSCH, and the periodic CSI is sent on the PUCCH; or, the periodic CSI and aperiodic CSI are combined into a new CSI report according to an agreed manner to be sent on the PUSCH corresponding to the DCI that triggers the transmission of the aperiodic CSI.

Mode 2

The PUCCH and PUSCH are allowed to be sent simultaneously, and a part of transmission of the uplink control signaling is sent on the PUCCH, and another part of the uplink control signaling is sent on the PUSCH.

Preferably, as to mode 2, the uplink carrier associated with the PUCCH and the uplink carrier associated with the PUSCH can be the same carrier or different carriers; and the uplink control signaling is one or more of an ACK/NACK message, a scheduling request, and periodic channel state information.

Preferably, as to mode 2, when the uplink control signaling only includes one of ACK/NACK message, scheduling request, and periodic channel state information or only includes the ACK/NACK message and the scheduling request SR, transmission of the uplink control signaling is on the PUCCH.

Preferably, as to mode 2, when the uplink control signaling includes some of the ACK/NACK message, the scheduling request SR, and the periodic channel state information CSI, the ACK/NACK message and/or the scheduling request SR is sent on the PUCCH, and the periodic CSI is sent on the PUSCH. When the uplink component carrier associated with the PUSCH includes an uplink primary component carrier (abbreviated as UL PCC), the periodic CSI is sent on the corresponding PUSCH of the uplink primary component carrier, and when the uplink component carrier associated with the PUSCH does not include the uplink primary component carrier, then one of the following manners is used to send the periodic CSI:

Manner 1: the periodic CSI is sent on the PUSCH corresponding to the uplink component carrier having a highest or lowest carrier frequency.

Manner 2: the periodic CSI is sent on the PUSCH corresponding to the uplink component carrier meeting a preset relationship with the uplink primary component carrier.

Manner 3: the periodic CSI is sent on the PUSCH corresponding to the uplink component carrier that is configured by a higher layer.

Manner 4: the periodic CSI is sent on the PUSCH corresponding to the uplink component carrier having a largest or smallest carrier index.

Preferably, as to mode 2, when the control field of triggering an aperiodic channel state information in one of the downlink control information corresponding to the PUSCH is enable, if the uplink control signaling includes periodic CSI and the aperiodic CSI does not include the channel state information of the downlink component carrier indicated by the periodic CSI, then the periodic CSI and aperiodic CSI are combined into a new CSI report according; to an agreed manner and the new CSI report is to be sent on the PUSCH corresponding to the DCI that triggers the transmission of the aperiodic CSI; and if the aperiodic CSI includes the CSI of the downlink component carrier indicated by the periodic CSI, then the aperiodic CSI is sent on the PUSCH corresponding to the DCI that triggers the transmission of the aperiodic CSI and the periodic CSI will not be sent.

Mode 3

The PUCCH and PUSCH are not allowed to be sent simultaneously, and the uplink control signaling is sent on the PUSCH and the PUCCH is not sent simultaneously.

Preferably, as to mode 3, when the PUSCH is to be sent on a plurality of uplink component carriers and one of the component carriers associated with the PUSCH is the uplink primary component carrier, the uplink control signaling is sent on the PUSCH corresponding to the UL PCC.

Preferably, as to mode 3, when the PUSCH is to be sent on a plurality of uplink component carriers and there is no component carrier associated with the PUSCH is the uplink primary component carrier, the uplink control signaling is sent using one of the following manners:

Manner 1: the uplink control signaling is sent on the PUSCH corresponding to the uplink component carrier having a highest or lowest carrier frequency;

Manner 2: the uplink control signaling is sent on the PUSCH corresponding to the uplink component carrier meeting a preset relationship with the uplink primary component carrier;

Manner 3: the uplink control signaling is sent on the PUSCH corresponding to the uplink component carrier that is configured by a higher layer, and Manner 4: the uplink control signaling is sent on the PUSCH corresponding to the uplink component carrier having a largest or smallest carrier index.

Preferably, as to mode 3, the uplink control signaling includes one or more of an ACK/NACK message and periodic CSI.

Preferably, as to mode 3, when the control field of triggering an aperiodic channel state information in one of the downlink control information corresponding to the PUSCH is enable, if the uplink control signaling includes periodic CSI and the aperiodic CSI does not include the channel state information of the downlink component carrier indicated by the periodic CSI, then the periodic CSI and aperiodic CSI are combined into a new CSI report according to an agreed manner and the new CSI report is to be sent on the PUSCH corresponding to the DCI that triggers the transmission of the aperiodic CSI; and if the aperiodic CSI includes the CSI of the downlink component carrier indicated by the periodic CSI, then the aperiodic CSI is sent on the PUSCH corresponding to the DCI that triggers the transmission of the aperiodic CSI and the periodic CSI will not be sent.

By way of the uplink control signaling feedback control mode provided by this embodiment, the base station configures the uplink control signaling feedback mode for the user equipment, and the user equipment sends the uplink control signaling according to the feedback mode indicated by the base station, thus ensuring that the base station can demodulate the uplink control signaling in a corresponding channel of the correct uplink component carrier.

Embodiment Two

In this embodiment, three preferred embodiments are provided: I. there is no aperiodic CSI feedback; II. there is aperiodic. CSI feedback but the aperiodic CSI does not include the downlink component carrier (DL CC) of the periodic CSI; III. there is aperiodic CSI feedback and the aperiodic CSI feedback includes the DL CC of the periodic CSI.

In this embodiment, the base station configures the user equipment to feed back the uplink control signaling using mode 1.

Preferred Embodiment 1

Figure 2:
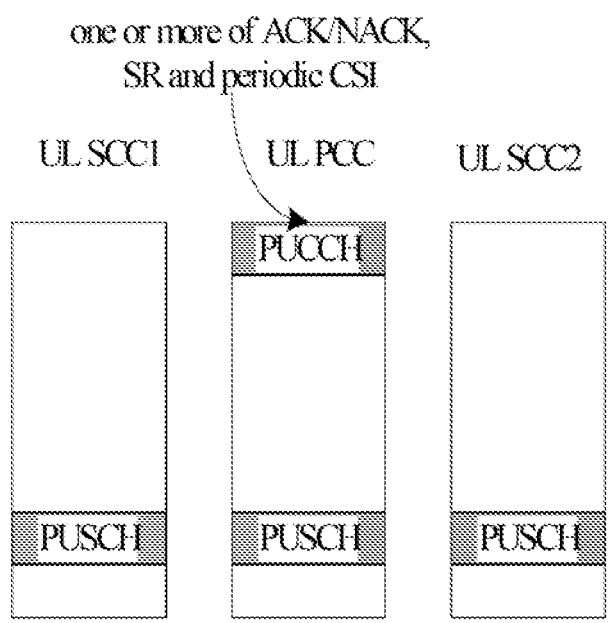
FIG. 2 is a schematic diagram of feedback mode 1 of an uplink control signaling according to the embodiments of the present invention.

As shown in FIG. 2, the uplink secondary component carrier SCC1 (abbreviated as SCC, the remaining CCs are all SCC except PCC), UL SCC2 and UL PCC all have PUSCH to be sent thereon, according to feedback mode 1, the user equipment allows the PUCCH and PUSCH to be sent simultaneously and all transmission of the uplink control signaling to be sent on the PUCCH.

When the uplink control signaling is an ACK/NACK message, then the ACK/NACK message is sent on the PUCCH; when the uplink control signaling is a scheduling request SR, then the scheduling request SR is sent on the PUCCH; and when the uplink control signaling is periodic CSI, then the periodic CSI is sent on the PUCCH.

When the uplink control signaling is ACK/NACK message and SR, then the method of multiplexing the SR and ACK/NACK on the PUCCH is used to send the uplink control signalling; when the uplink control signaling is ACK/NACK message and periodic CSI, then the method of multiplexing the periodic CSI and ACK/NACK on the PUCCH is used to send the uplink control signaling; and when the uplink control signaling is periodic CSI and the scheduling request SR, then the method of multiplexing the SR and periodic CSI on the PUCCH is used to send the uplink control signaling.

Preferred Embodiment 2

Figure 3:
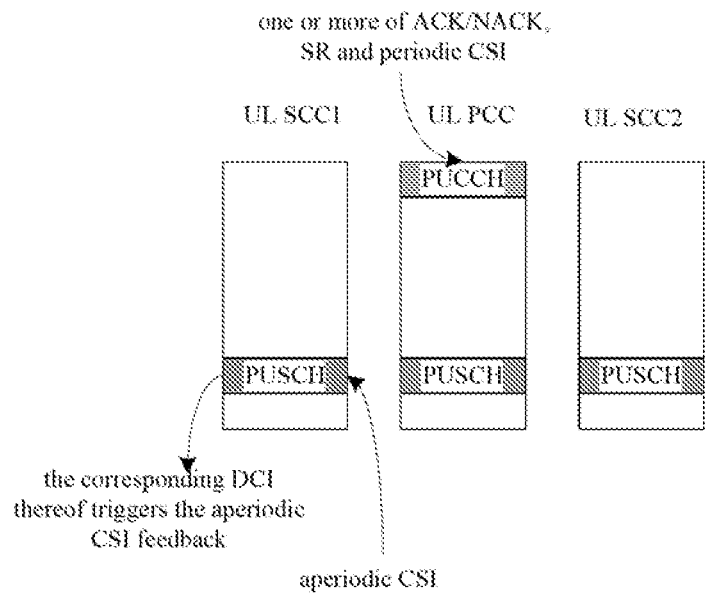
FIG. 3 is another schematic diagram of feedback mode 1 of an uplink control signaling according to the embodiments of the present invention.
Figure 4:
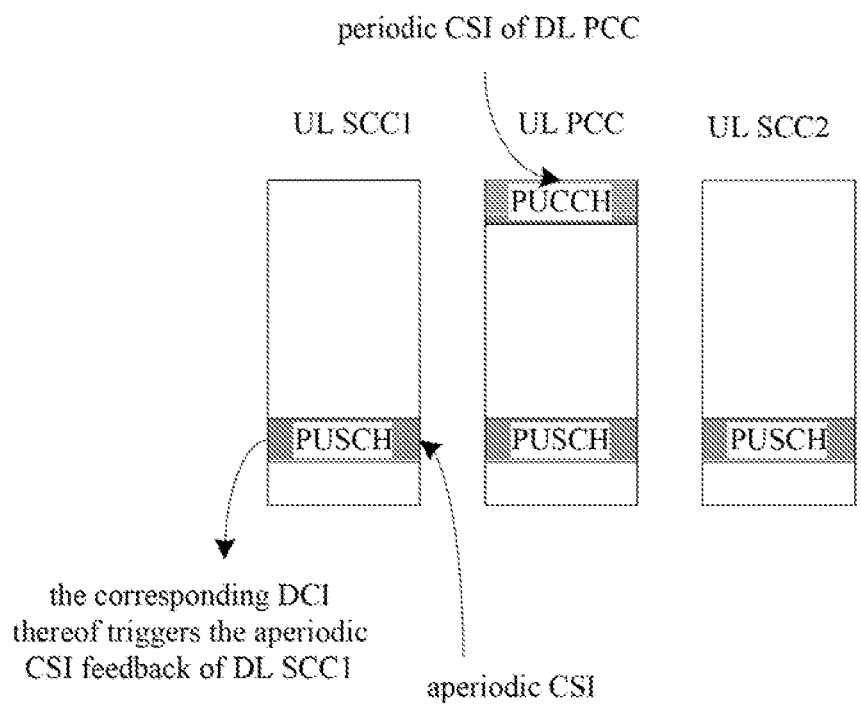
FIG. 4 is another schematic diagram of feedback mode 1 of an uplink control signaling according to the embodiments of the present invention.

As shown in FIGS. 3 and 4, the UL SCC1, UL SCC2 and UL PCC all have PUSCH to be sent thereon, and the control field of triggering an aperiodic channel state information in the DCI corresponding to the UL SCC1 is enable to triggers the aperiodic CSI feedback of DL SCC1, and according to feedback mode 1, the user equipment allows the PUCCH and PUSCH to be sent simultaneously and all transmission of the uplink control signaling on the PUCCH.

When the uplink control signaling is an ACK/NACK message, then the ACK/NACK message is sent on the PUCCH, and the aperiodic CSI of DL SCC1 is sent on the PUSCH of UL SCC1; when the uplink control signaling is a scheduling request SR, then the scheduling request SR is sent on the PUCCH, and the aperiodic CSI of DL SCC1 is sent on the PUSCH of UL SCC1; when the uplink control signaling is the periodic CSI of DL PCC, then the periodic CSI of DL PCC is sent on the PUCCH, and the aperiodic CSI of DL SCC1 is sent on the PUSCH, or the periodic CSI of DL PCC and aperiodic CSI of DL SCC1 are combined into a new CSI report according to an agreed manner and the new CSI report is to be sent on the PUSCH of UL SCC1.

When the uplink control signaling is ACK/NACK message and SR, then the method of multiplexing the SR and ACK/NACK on the PUCCH is used to send the uplink control signaling, and the aperiodic CSI of DL SCC1 is sent on the PUSCH of UL SCC1; when the uplink control signaling is ACK/NACK message and periodic CSI of DL PCC, the method of multiplexing the periodic CSI and ACK/NACK on the PUCCH is used to send the uplink control signalling, and the aperiodic CSI of DL SCC1 is sent on the PUSCH of UL SCC1; and when the uplink control signaling is periodic CSI and the scheduling request SR, then the method of multiplexing the SR and periodic CSI on the PUCCH to send the uplink control signaling, and the aperiodic CSI of DL SCC1 is sent on the PUSCH of UL SCC1.

Preferred Embodiment 3

Figure 5:
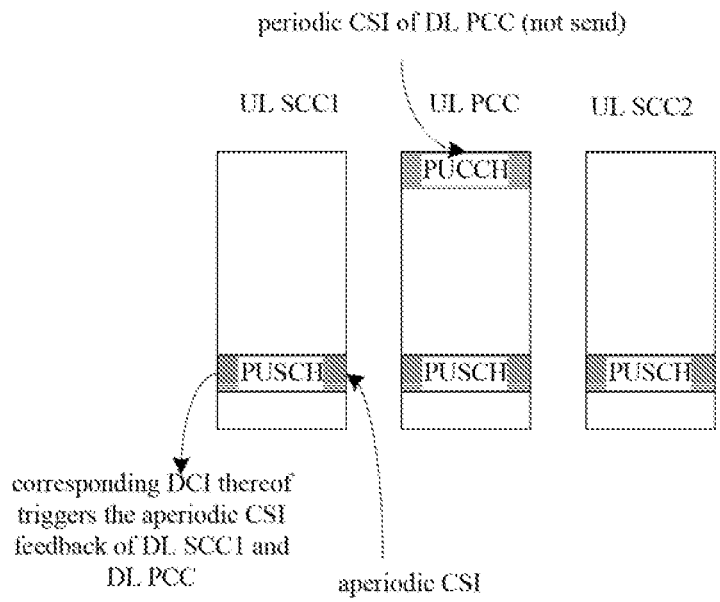
FIG. 5 is another schematic diagram of feedback mode 1 of an uplink control signaling according to the embodiments of the present invention.

As shown in FIG. 5, the UL SCC1, UL SCC2 and UL PCC all have PUSCH to be sent thereon, and the control field of triggering an aperiodic channel state information in the DCI corresponding to the UL SCC1 is enable and triggers the aperiodic CSI feedback of DL PCC and DL SCC1, and according to feedback mode 1, the user equipment allows the PUCCH and PUSCH to be sent simultaneously and all transmission of the uplink control signaling on the PUCCH.

When the uplink control signaling is an ACK/NACK message, then the ACK/NACK message is sent on the PUCCH, and the aperiodic CSI of DL PCC and DL SCC1 is sent on the PUSCH of UL SCC1; when the uplink control signaling is a scheduling request SR, then the scheduling request SR is sent on the PUCCH, and the aperiodic CSI of DL PCC and DL SCC1 is sent on the PUSCH of UL SCC1; and when the uplink control signaling is the periodic CSI of DL PCC, since the aperiodic CSI includes DL PCC, then the aperiodic CSI of DL PCC and DL SCC1 is sent on the PUSCH of UL SCC1 and the periodic CSI of DL PCC will not be sent out.

When the uplink control signaling is ACK/NACK message and SR, then the method of multiplexing the SR and ACK/NACK on the PUCCH is used to send the uplink control signaling, and the aperiodic CSI of DL PCC and DL SCC1 is sent on the PUSCH of UL SCC1; when the uplink control signaling is ACK/NACK message and periodic CSI of DL PCC, since the aperiodic CSI report includes DL PCC, then the ACK/NACK is sent on the PUCCH, the periodic CSI of DL PCC is not sent and the aperiodic CSI of DL PCC and DL SCC1 is sent on the PUSCH of UL SCC1; and when the uplink control signaling is the periodic CSI of DL PCC and the scheduling request SR, since the aperiodic CSI report includes DL PCC, then the SR is sent on the PUCCH, and the aperiodic CSI of DL PCC and DL SCC1 is sent on the PUSCH of UL SCC1 and the periodic CSI of DL PCC will not be sent out.

Embodiment Three

In this embodiment, four preferred embodiments are provided: I. there is no aperiodic CSI feedback and the PCC has PUSCH to send thereon; II. there is no aperiodic CSI feedback and the PCC has no PUSCH to send thereon; III. there is aperiodic CSI feedback but the aperiodic CSI feedback does not include the DL CC of the periodic CSI feedback; and IV. there is aperiodic CSI feedback and the aperiodic CSI feedback includes the DL CC of the periodic CSI.

In this embodiment, the base station configures the user equipment to feed back the uplink control signaling using mode 2.

Preferred Embodiment 1

Figure 6:
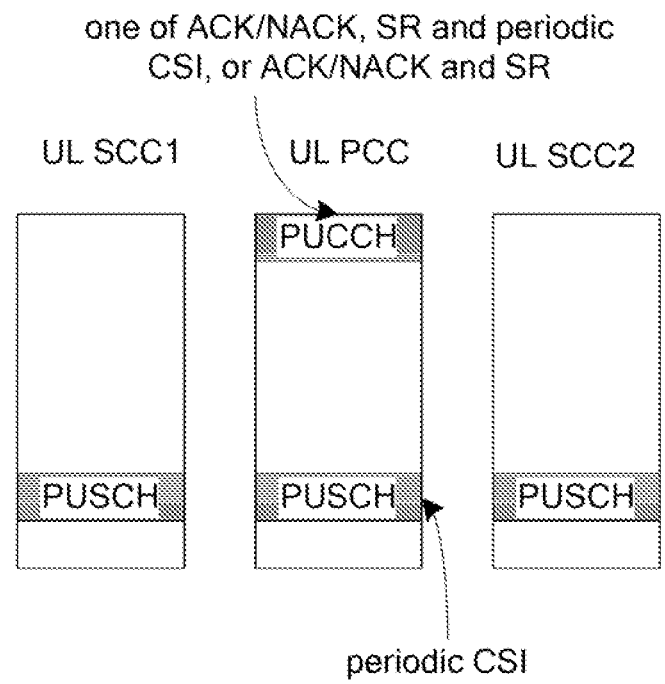
FIG. 6 is a schematic diagram of feedback mode 2 of an uplink control signaling according to the embodiments of the present invention.

As shown in FIG. 6, UL SCC1, UL SCC2 and UL PCC all have PUSCH to send thereon, and according to feedback mode 2, the user equipment allows the PUCCH and PUSCH to be sent simultaneously, and a part of transmission of the uplink control signaling on the PUCCH, and another part of the uplink control signaling is sent on the PUSCH.

When the uplink control signaling is an ACK/NACK message, then the ACK/NACK message is sent on the PUCCH; when the uplink control signaling is a scheduling request SR, then the scheduling request SR is sent on the PUCCH, and when the uplink control signaling is periodic CSI, then the periodic CSI is sent on the PUCCH.

When the uplink control signaling is ACK/NACK message and SR, then the method of multiplexing the SR and ACK/NACK on the PUCCH is used to send the up link control signaling; when the uplink control signaling is ACK/NACK message and periodic CSI, then the ACK/NACK message is sent on the PUCCH and periodic CSI is sent on the PUSCH of UL PCC; and when the uplink control signaling is scheduling request SR and periodic CSI, then the SR is sent on the PUCCH and periodic CSI is sent on the PUSCH of UL PCC.

Preferred Embodiment 2

Figure 7:
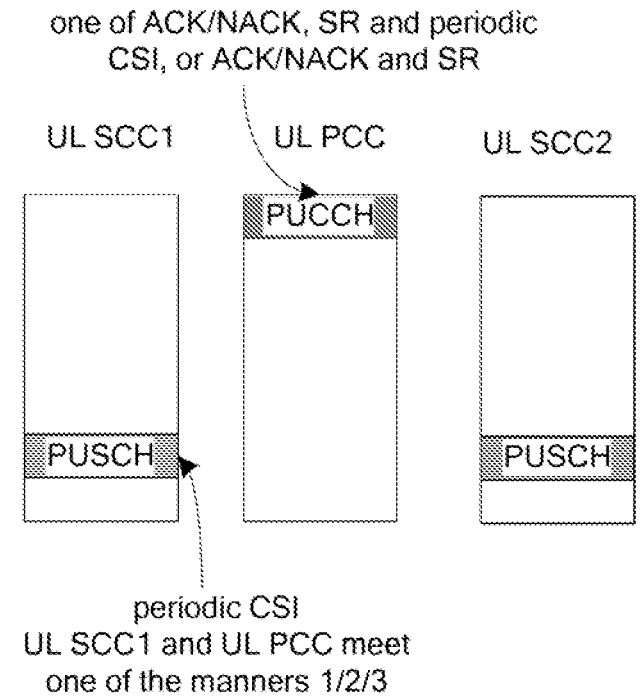
FIG. 7 is another schematic diagram of feedback mode 2 of an uplink control signaling according to the embodiments of the present invention.

As shown in FIG. 7, both UL SCC1 and UL SCC2 have PUSCH to send, and the UL PCC has no PUSCH to send, according to feedback mode 2, the user equipment allows the PUCCH and PUSCH to be sent simultaneously, and a part of transmission of the uplink control signaling on the PUCCH, and another part of the uplink control signaling is sent on the PUSCH, and assuming that the UL SCC1 is UL CC with the lowest carrier frequency in the UL CCs which send PUSCH.

When the uplink control signaling is an ACK/NACK message, then the ACK/NACK message is sent on the PUCCH; when the uplink control signaling is a scheduling request SR, then the scheduling request SR is sent on the PUCCH; and when the uplink control signaling is periodic CSI, then the periodic CSI is sent on the PUCCH.

When the uplink control signaling is ACK/NACK message and SR, then the method of multiplexing the SR and ACK/NACK on the PUCCH is used to send the uplink control signaling; when the uplink control signaling is ACK/NACK message and periodic CSI, then the ACK/NACK message is sent on the PUCCH and periodic. CSI is sent on the PUSCH of UL SCC1; and when the uplink control signaling is scheduling request SR and periodic CSI, then the SR is sent on the PUCCH and periodic CSI is sent on the PUSCH of UL SCC1.

Preferred Embodiment 3

Figure 8:
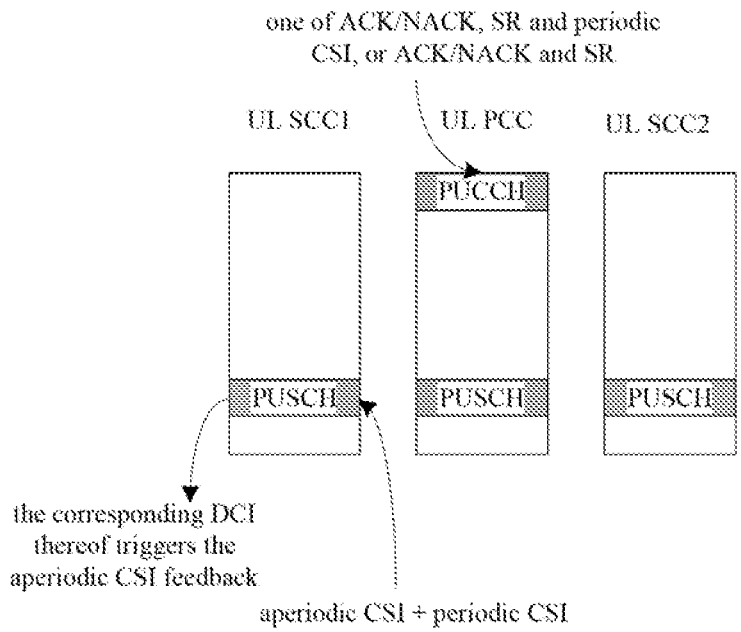
FIG. 8 is another schematic diagram of feedback mode 2 of an uplink control signaling according to the embodiments of the present invention.
Figure 9:
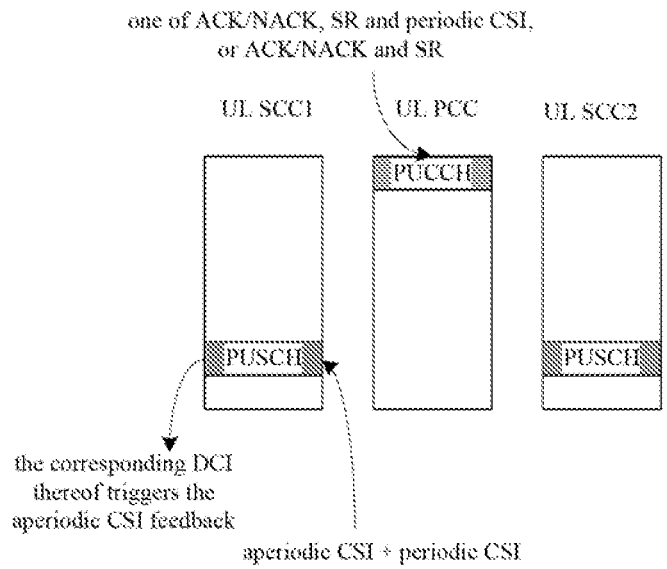
FIG. 9 is another schematic diagram of feedback mode 2 of an uplink control signaling according to the embodiments of the present invention.

As shown in FIG. 8, the UL SCC1, UL SCC2 and UL PCC all have PUSCH to send thereon, and as shown in FIG. 9, both UL SCC1 and UL SCC2 have PUSCH to send thereon, in FIGS. 8 and 9 the control field of triggering an aperiodic channel state information in the DCI corresponding to UL SCC1 is enable and triggers the aperiodic CSI of DL CC1, according to feedback mode 2, the user equipment allows the PUCCH and PUSCH to be sent simultaneously, and a part of transmission of the uplink control signaling on the PUCCH, and another part of the uplink control signaling is sent on the PUSCH.

When the uplink control signaling is an ACK/NACK message, then the ACK/NACK message is sent on the PUCCH, and the aperiodic CSI of DL SCC1 is sent on the PUSCH of UL SCC1; when the uplink control signaling is a scheduling request SR, then the scheduling request SR is sent on the PUCCH, and the aperiodic CSI of DL SCC1 is sent on the PUSCH of UL SCC1; when the uplink control signaling is the periodic CSI of DL PCC, then the periodic CSI of DL PCC is sent on the PUCCH, and the aperiodic CSI of DL SCC1 is sent on the PUSCH of UL SCC1.

When the uplink control signaling is ACK/NACK message and SR, then the method of multiplexing the SR and ACK/NACK on the PUCCH is used to send the uplink control signaling and the aperiodic CSI of DL CC1 is sent on the PUSCH of UL SCC1; when the uplink control signaling is ACK/NACK message and periodic CSI of DL PCC, then the ACK/NACK message is sent on the PUCCH the periodic CSI of DL PCC and the aperiodic CSI of DL SCC1 are combined into a new CSI report and the new CSI report is sent on the PUSCH of UL SCC1; and when the uplink control signaling is scheduling request SR and periodic CSI of DL SCC1, then the SR is sent on the PUCCH and the periodic CSI of DL PCC and the aperiodic CSI of DL SCC1 are combined into a new CSI report and the new CSI report is sent on the PUSCH of UL SCC1.

Preferred Embodiment 4

Figure 10:
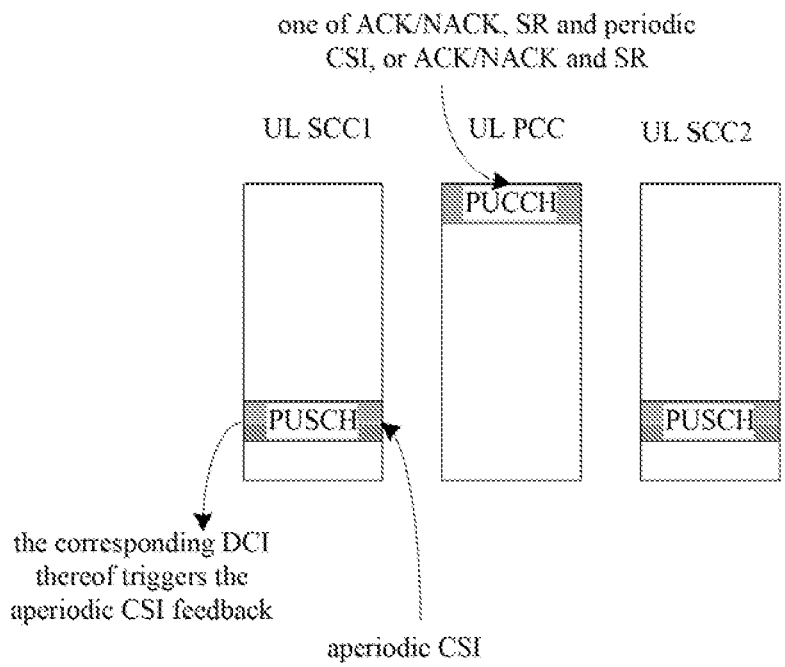
FIG. 10 is another schematic diagram of feedback mode 2 of an uplink control signaling according to the embodiments of the present invention.

As shown in FIG. 10, the UL SCC1, UL SCC2 and UL PCC all have PUSCH to be sent thereon, and the control field of triggering an aperiodic channel state information in the DCI corresponding to the UL SCC1 is enable and triggers the aperiodic CSI feedback of DL PCC and DL SCC1, and according to feedback mode 2, the user equipment allows the PUCCH and PUSCH to be sent simultaneously, and a part of transmission of the uplink control signaling on the PUCCH, and another part of the uplink control signaling is sent on the PUSCH.

When the uplink control signaling is an ACK/NACK message, then the ACK/NACK message is sent on the PUCCH, and the periodic CSI of DL PCC and DL SCC1 is sent on the PUSCH of UL SCC1; when the uplink control signaling is a scheduling request SR, then the scheduling request SR is sent on the PUCCH, and the aperiodic CSI of DL PCC and DL SCC1 is sent on the PUSCH of UL SCC1; when the uplink control signaling is the periodic CSI of DL PCC, since the aperiodic CSI include DL PCC, then the aperiodic CSI of DL PCC and DL SCC1 is sent on the PUSCH of UL SCC1 and the periodic CSI of DL PCC will not be sent out.

When the uplink control signaling is ACK/NACK message and SR, then the method of multiplexing the SR and ACK/NACK on the PUCCH is used to send the uplink control signaling, and the aperiodic CSI of DL PCC and DL SCC1 is sent on the PUSCH of UL SCC1; when the uplink control signaling is ACK/NACK message and periodic CSI of DL PCC, since the aperiodic CSI includes DL PCC, then the ACK/NACK is sent on the PUCCH, the aperiodic CSI of DL PCC and DL SCC1 is sent on the PUSCH of UL SCC1, and the periodic CSI of DL PCC will not be sent out; and when the uplink control signaling is scheduling request SR and the periodic CSI of DL PCC, since the aperiodic CSI includes DL PCC, then the SR is sent on the PUSCH, and the aperiodic CSI of DL PCC and DL SCC1 is sent on the PUSCH of UL SCC1 and the periodic CSI of DL PCC will not be sent out.

Embodiment Four

In this embodiment, four preferred embodiments are provided: I. there is no aperiodic CSI and there is a PUSCH on UL PCC; II. there is no aperiodic CSI and there is no PUSCH on UL PCC; III. there is aperiodic CSI and the aperiodic CSI does not include the DL CC of the periodic CSI; and IV. there is aperiodic CSI and the aperiodic CSI includes the DL CC of the periodic CSI.

In this embodiment, the base station configures the user equipment to feed back the uplink control signaling using mode 3.

Preferred Embodiment 1

Figure 11:
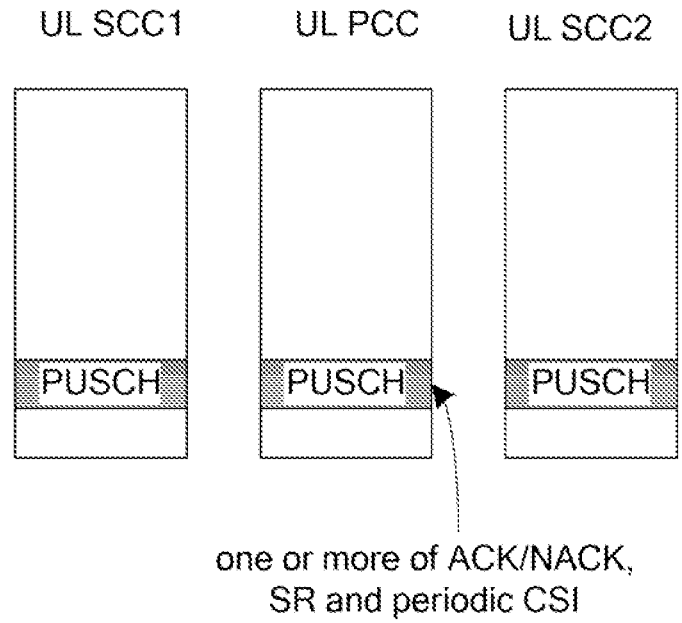
FIG. 11 is a schematic diagram of feedback mode 3 of an uplink control signaling according to the embodiments of the present invention.

As shown in FIG. 11, the UL SCC1, UL SCC2 and UL PCC all have PUSCH to send thereon, and according to feedback mode 3, the user equipment does not allow the PUCCH and PUSCH to be sent simultaneously, the uplink control signaling is to be sent on the PUSCH and the PUCCH will not be sent out.

When the uplink control signaling is an ACK/NACK message, then the ACK/NACK message is sent on the PUSCH corresponding to UL PCC; when the uplink control signaling is periodic CSI, then the periodic CSI is sent on the PUSCH corresponding to UL PCC; and when the uplink control signaling is ACK/NACK message and periodic CSI, then both the ACK/NACK message and periodic CSI are sent on the PUSCH of UL PCC.

Preferred Embodiment 2

Figure 12:
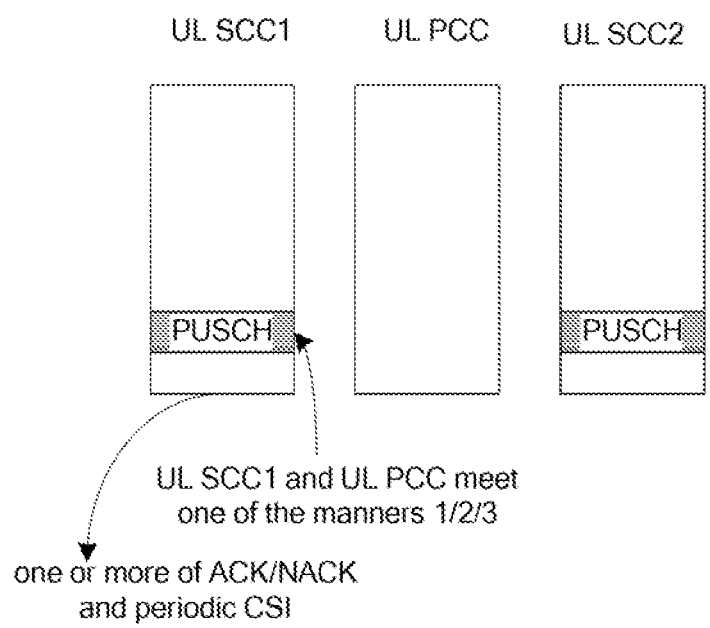
FIG. 12 is another schematic diagram of feedback mode 3 of an uplink control signaling according to the embodiments of the present invention.

As shown in FIG. 12, both UL SCC1 and UL SCC2 have PUSCH to send, and the UL PCC has no PUSCH to send, according to feedback mode 3; assuming that UL SCC1 is a UL CC with the lowest carrier frequency in the UL CCs sent by the PUSCH, then according to feedback mode 3, the user equipment does not allow the PUCCH and PUSCH to be sent simultaneously, and transmission of the uplink control signaling on the PUSCH, and the PUCCH will not be sent out.

When the uplink control signaling is an ACK/NACK message, then the ACK/NACK message is sent on the PUSCH corresponding to UL SCC1; and when the uplink control signaling is periodic CSI, then the periodic CSI is sent on the PUSCH corresponding to UL SCC1. When the uplink control signaling is ACK/NACK message and periodic CSI, then the ACK/NACK message and periodic CSI are sent on the PUSCH of UL SCC1.

Preferred Embodiment 3

Figure 13:
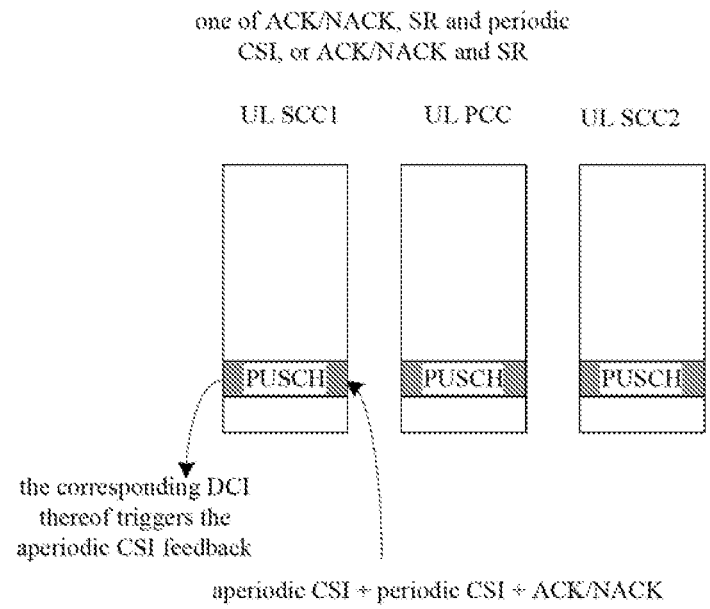
FIG. 13 is another schematic diagram of feedback mode 3 of an uplink control signaling according to the embodiments of the present invention.

As shown in FIG. 13, the UL SCC1, UL SCC2 and UL PCC all have PUSCH to be sent thereon, and the control field of triggering an aperiodic channel state information in the DCI corresponding to the UL SCC1 is enable and triggers the aperiodic CSI feedback of DL SCC1, and according to feedback mode 3, the user equipment does not allows the PUCCH and PUSCH to be sent simultaneously, all the uplink control signaling is sent on PUSCH, and the PUCCH will not be sent out.

When the uplink control signaling is an ACK/NACK message, then the ACK/NACK message and the aperiodic CSI of DL SCC1 is sent on the PUSCH of UL SCC1; when the uplink control signaling is the periodic CSI of DL PCC, then the periodic CSI of DL PCC and aperiodic CSI of DL SCC1 are combined into a new CSI report according to an agreed manner and the new CSI report is sent on the PUSCH of UL SCC1; and when uplink control signaling is ACK/NACK message and periodic CSI of DL PCC, then the periodic CSI of DL PCC and aperiodic CSI of DL SCC1 are combined into a new CSI report according to an agreed manner and the new CSI report is sent together with the ACK/NACK message on the PUSCH of UL SCC1, Preferred Embodiment 4

Figure 14:
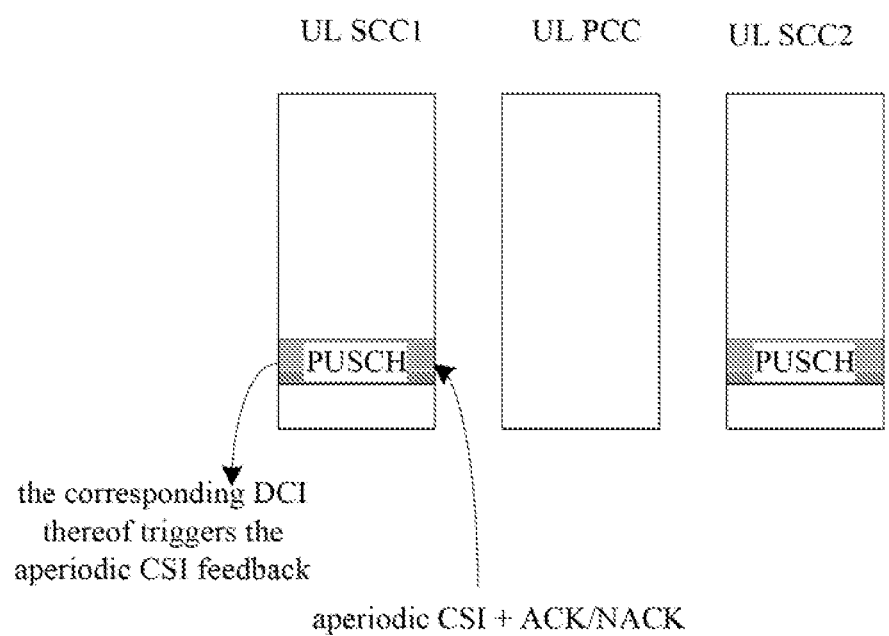
FIG. 14 is another schematic diagram of feedback mode 3 of an uplink control signaling according to the embodiments of the present invention.
Figure 15:
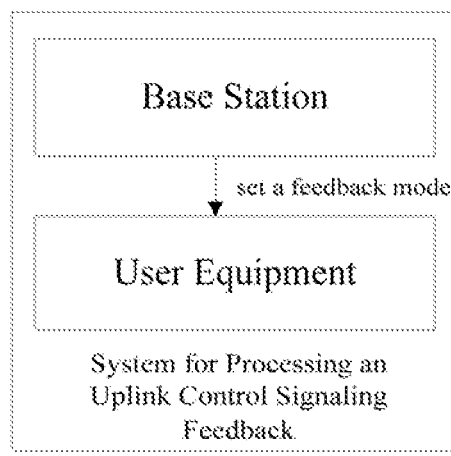
FIG. 15 is a structural block diagram of a system for processing an uplink control signaling feedback according to the embodiments of the present invention.

As shown in FIG. 14, both the UL SCC1 and UL SCC2 have PUSCH to be sent thereon and the UL PCC has no PUSCH to be sent thereon, and the control field of triggering an aperiodic channel state information in the DCI corresponding to the UL SCC1 is enable and triggers the aperiodic CSI feedback of DL PCC and DL SCC1, and according to feedback mode 3, the user equipment does not allows the PUCCH and PUSCH to be sent simultaneously, and the uplink control signaling is sent on PUSCH and the PUCCH will not be sent out.

When the uplink control signaling is an ACK/NACK message, then the ACK/NACK message and the aperiodic CSI of DL PCC and DL SCC1 are sent on the PUSCH; when the uplink control signaling is the periodic CSI of DL PCC, since the aperiodic CSI includes the DL PCC, then aperiodic CSI of DL PCC and DL SCC1 are sent on the PUSCH of the UL SCC1 and the periodic CSI of DL PCC will not be sent out; when the uplink control signaling is ACK/NACK message and the periodic CSI of DL PCC, since the aperiodic CSI includes the DL PCC, then the ACK/NACK and the aperiodic CSI of DL PCC and DL SCC are sent on the PUSCH of UL SCC1, and at the same time the periodic CSI of DL PCC will not be sent out.

In summary, by way of the present invention, the problem regarding how to send the uplink control signaling is not disclosed in relevant art and it causes that the uplink control signaling cannot be processed correctly is solved, thus it is ensured that the base station can correctly demodulate the uplink control signaling.

Obviously, those skilled in the art should understand that the above module or steps of the present invention can be implemented using a general-purpose computing apparatus, and they can be integrated on a single computing apparatus or distributed over a network consisted of multiple computing apparatus; optionally, they can be implemented using computing apparatus executable program code, thus, they can be stored in a storage for being executed by the computing apparatus, and in some cases, the shown or described steps can be performed in an order different from the order here, or they can be made into various integrated circuit modules respectively, or some modules or steps therein are made into a single integrated circuit module for implementation. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. A method for processing an uplink control signaling feedback, comprising:
    configuring, by a base station, a feedback mode of an uplink control signaling for user equipment, wherein the feedback mode is extended to mobile device, wherein the feedback mode is used for instructing the user equipment a manner in which to transmit the uplink control signaling on a physical uplink control channel (PUCCH), or a physical uplink shared channel (PUSCH), or a PUCCH and a PUSCH; and
    the user equipment sending the uplink control signaling according to the feedback mode;
    wherein the feedback mode comprises: allowing a simultaneous transmission of the PUCCH and the PUSCH, and transmission of the uplink control signaling on the PUCCH, wherein the uplink control signaling includes at least one of an acknowledgement/negative acknowledgement (ACK/NACK) message, a scheduling request, and periodic channel state information;
    wherein when the user equipment determines that a control field of triggering an aperiodic channel state information in downlink control information corresponding to the PUSCH is enabled,
        if the uplink control signaling does not include the periodic channel state information, the aperiodic channel state information is sent on the corresponding PUSCH;
        if the uplink control signaling includes the periodic channel state information and the aperiodic channel state information includes the channel state information of a downlink component carrier indicated by the periodic channel state information, the aperiodic channel state information is sent on the corresponding PUSCH while the periodic channel state information is dropped; and
        if the uplink control signaling includes the periodic channel state information but the aperiodic channel state information does not include the channel state information of the downlink component carrier indicated by the periodic channel state information, the aperiodic channel state information is sent on the corresponding PUSCH and the periodic channel state information is sent on the PUCCH, or the periodic channel state information and the aperiodic channel state information are combined into a new channel state information report, and the new channel state information is sent on the PUSCH that corresponds to the downlink control information that triggers the transmission of the aperiodic channel state information.

2. The method according to claim 1, wherein if the uplink control signaling includes at least two of the ACK/NACK message, the scheduling request, or the periodic channel state information, the uplink control signaling is multiplexed on the PUCCH.

3. The method according to claim 1, wherein the feedback mode further comprises transmission of the uplink control signaling on the PUCCH and the PUSCH.

4. The method according to claim 3, wherein if the uplink control signaling only includes one of the ACK/NACK message, the scheduling request, and the periodic channel state information, or includes the ACK/NACK message and the scheduling request, then it is sent on the PUCCH.

5. The method according to claim 3, wherein if the uplink control signaling includes the periodic channel state information and at least one of the ACK/NACK message and the scheduling request, then at least one of the ACK/NACK message and the scheduling request is sent on the PUCCH, and the periodic channel state information is sent on the PUSCH.

6. The method according to claim 5, wherein the periodic channel state information is sent on the PUSCH comprises:
    if the uplink component carriers on which the PUSCH are to be sent include an uplink primary component carrier, the periodic channel state information is sent on a PUSCH corresponding to the uplink primary component carrier;
    if the uplink component carriers on which the PUSCH are to be sent do not include the uplink primary component carrier, the periodic channel state information is sent in one of the following manners:
    the periodic channel state information is sent on a PUSCH corresponding to an uplink component carrier with a highest or lowest carrier frequency;
    the periodic channel state information is sent on a PUSCH corresponding to an uplink component carrier meeting a preset relationship with the uplink primary component carrier; and
    the periodic channel state information is sent on a PUSCH corresponding to an uplink component carrier that is configured by a higher layer; or
    the periodic channel state information is sent on a PUSCH corresponding to an uplink component carrier with a largest or smallest carrier index.

7. The method according to claim 1, wherein the carrier associated with the PUCCH and the carrier associated with the PUSCH are either the same carrier or different carriers.

8. The method according to claim 3, wherein when the control field of triggering an aperiodic channel state information in downlink control information corresponding to the PUSCH is enable,
    if the uplink control signaling does not include the periodic channel state information, the aperiodic channel state information is sent on the corresponding PUSCH;
    if the uplink control signaling includes the periodic channel state information and the aperiodic channel state information does not include the channel state information of a downlink component carrier indicated by the periodic channel state information, then the periodic channel state information and the aperiodic channel state information are combined into a new channel state information report, and the new channel state information is sent on the PUSCH that corresponds to the downlink control information that triggers the transmission of the aperiodic channel state information; and if the uplink control signaling includes the periodic channel state information and the aperiodic channel state information includes the channel state information of the downlink component carrier indicated by the periodic channel state information, then the aperiodic channel state information is sent on the PUSCH corresponding to the downlink control information that triggers transmission of the aperiodic channel state information while the periodic channel state information is not sent out.

9. A system for processing an uplink control signaling feedback, comprising a base station and user equipment, wherein:
the base station is configured to set a feedback mode of an uplink control signaling for the user equipment, wherein the feedback mode is used for instructing the user equipment a manner in which to transmit the uplink control signaling on a PUCCH, or a PUSCH, or a PUCCH and a PUSCH; and
the user equipment is configured to send the uplink control signaling according to the feedback mode;
wherein the feedback mode configured by the base station for the user equipment comprises: allowing a simultaneous transmission of the PUCCH and the PUSCH, and transmission of the uplink control signaling on the PUCCH, wherein the uplink control signaling includes at least one of: an ACK/NACK message, a scheduling request, and periodic channel state information;
wherein when a control field of triggering an aperiodic channel state information in downlink control information corresponding to the PUSCH is enable;
if the uplink control signaling does not include the periodic channel state information, the aperiodic channel state information is sent on the corresponding PUSCH;
if the uplink control signaling includes the periodic channel state information and the aperiodic channel state information includes the channel state information of a downlink component carrier indicated by the periodic channel state information, the aperiodic channel state information is sent on the corresponding PUSCH while the periodic channel state information is dropped; and
if the uplink control signaling includes the periodic channel state information but the aperiodic channel state information does not include the channel state information of the downlink component carrier indicated by the periodic channel state information, the aperiodic channel state information is sent on the corresponding PUSCH and the periodic channel state information is sent on the PUCCH, or the periodic channel state information and the aperiodic channel state information are combined into a new channel, state information report, and the new channel state information is sent on the PUSCH that corresponds to the downlink control information that triggers the transmission of the aperiodic channel state information.

10. The system according to claim 9, wherein the feedback mode further comprises transmission of the uplink control signaling on the PUCCH and the PUSCH.

11. A method for processing an uplink control signaling feedback, comprising:
a base station configuring a feedback mode of an uplink control signaling for user equipment, wherein the feedback mode is used for instructing the user equipment a manner in which to transmit the uplink control signaling on a physical uplink control channel (PUCCH), or a physical uplink shared channel (PUSCH), or a PUCCH and a PUSCH; and
the user equipment sending the uplink control signaling according to the feedback mode;
wherein the feedback mode includes: not allowing a simultaneous transmission of the PUCCH and the PUSCH, and the uplink control signaling is sent on the PUSCH and the PUCCH is not sent simultaneously;
wherein when a control field of triggering an aperiodic channel state information in downlink control information corresponding to the PUSCH is enable,
if the uplink control signaling does not include the periodic channel state information, the aperiodic channel state information is sent on the corresponding PUSCH;
if the uplink control signaling includes the periodic channel state information and the aperiodic channel state information does not include the channel state information of a downlink component carrier indicated by the periodic channel state information, then the periodic channel state information and the aperiodic channel state information are combined into a new channel state information report, and the new channel state information is sent on the PUSCH that corresponds to the downlink control information that triggers the transmission of the aperiodic channel state information; and
if the uplink control signaling includes the periodic channel state information and the aperiodic channel state information includes the channel state information of the downlink component carrier indicated by the periodic channel state information, then the aperiodic channel state information is sent on the PUSCH corresponding to the downlink control information that triggers transmission of the aperiodic channel state information while the periodic channel state information is not sent out.

12. The method according to claim 11, wherein the uplink control signaling being sent on the PUSCH comprises:
if the uplink component carriers on which the PUSCH are to be sent include an uplink primary component carrier, the uplink control information is sent on a PUSCH corresponding to the uplink primary component carrier;
if the uplink component carriers on which the PUSCH are to be sent do not include the uplink primary component carrier, the uplink control signaling is sent by one of the following manners;
the uplink control signaling is sent on the PUSCH corresponding to an uplink component carrier with a highest or lowest carrier frequency;
the uplink control signaling is sent on the PUSCH corresponding to an uplink component carrier meeting a preset relationship with the uplink primary component carrier;
the uplink control signaling is sent on the PUSCH corresponding to an uplink component carrier that is configured by a higher layer; or
the uplink control signaling is sent on the PUSCH corresponding to an uplink component carrier with a largest or smallest carrier index.

13. A system for processing an uplink control signaling feedback, comprising a base station and user equipment, wherein:
the base station is configured to set a feedback mode of an uplink control signaling for the user equipment, wherein the feedback mode is used for instructing the user equipment a manner in which to transmit the uplink control signaling on a PUCCH, or a PUSCH, or a PUCCH and a PUSCH; and the user equipment is configured to send the uplink control signaling according to the feedback mode;

wherein the feedback mode comprises: not allowing a simultaneous transmission of the PUCCH and the PUSCH, and the uplink control signaling is sent on, the PUSCH without being sent out on the PUCCH simultaneously;

wherein when a control field of triggering an aperiodic channel state information in downlink control information corresponding to the PUSCH is enable, if the uplink control signaling does not include the periodic channel state information, the aperiodic channel state information is sent on the corresponding PUSCH;

if the uplink control signaling includes the periodic channel state information and the aperiodic channel state information does not include the channel state information of a downlink component carrier indicated by the periodic channel state information, then the periodic channel state information and the aperiodic channel state information are combined into a new channel state information report, and the new channel state information is sent on the PUSCH that corresponds to the downlink control information that triggers the transmission of the aperiodic channel state information; and if the uplink control signaling includes the periodic channel state information and the aperiodic channel state information includes the channel state information of the downlink component carrier indicated by the periodic channel state information, then the aperiodic channel state information is sent on the PUSCH corresponding to the downlink control information that triggers transmission of the aperiodic channel state, information while the periodic channel state information is not sent out.

* * * * *